UNITED STATES PATENT OFFICE.

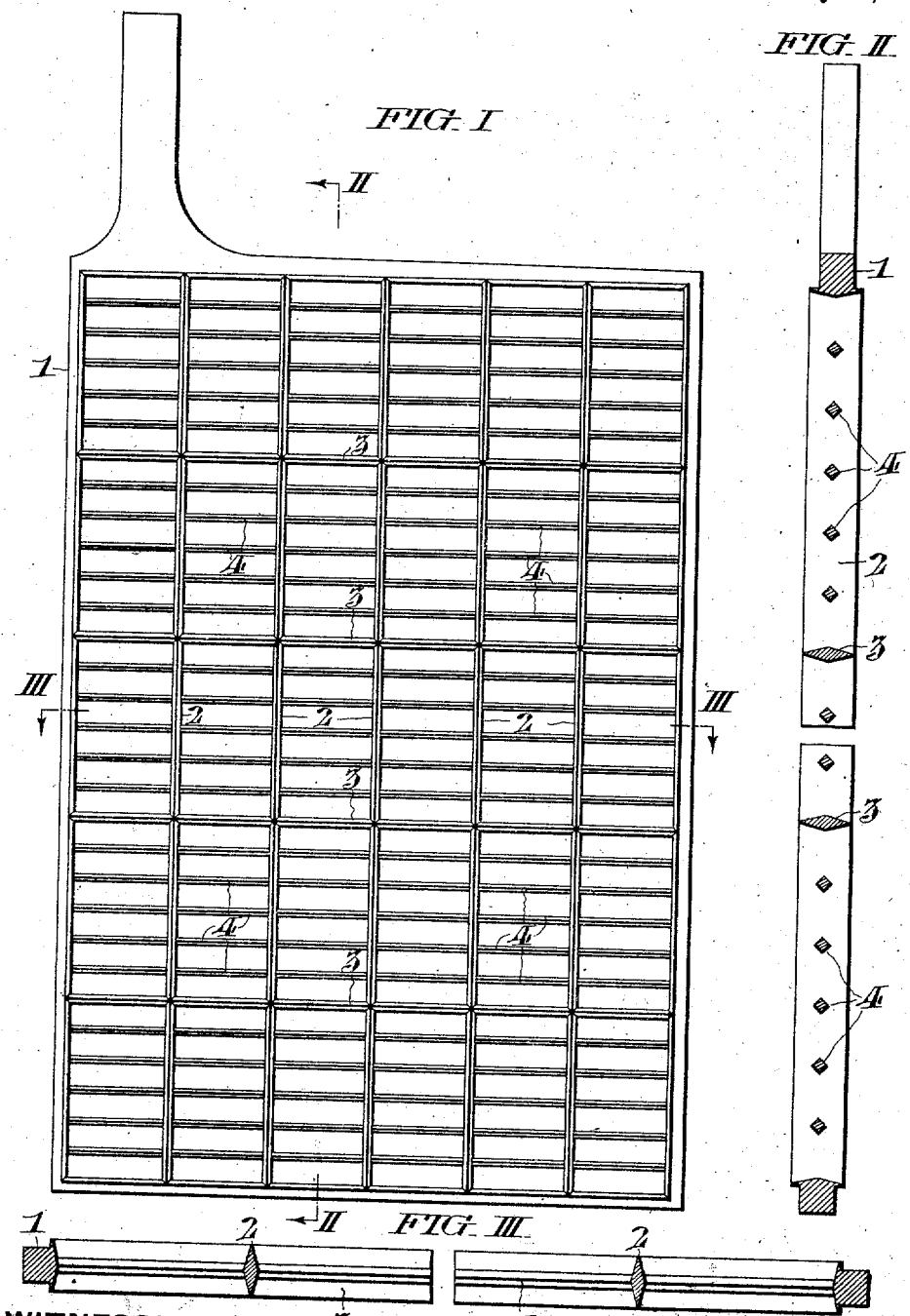

PEDRO G. SALOM, OF PHILADELPHIA, PENNSYLVANIA.

NEGATIVE PLATE FOR STORAGE BATTERIES AND PROCESS FOR THE MANUFACTURE THEREOF.

960,115.  Specification of Letters Patent.  Patented May 31, 1910.

Application filed July 27, 1909. Serial No. 509,855.

*To all whom it may concern:*

Be it known that I, PEDRO G. SALOM, of Philadelphia, in the county of Philadelphia and State of Pennsylvania, have invented certain new and useful Improvements in Negative Plates for Storage Batteries and in Processes for the Manufacture Thereof, whereof the following is a specification, reference being had to the accompanying drawings.

In said drawings, I have shown a preferred form of conducting support adapted for use in connection with my invention, which support constitutes the subject of an application filed contemporaneously herewith, being Serial Number 509,857, but it will of course be understood that my invention is not in any way limited to the use thereof.

As at present commercially conducted, and apart from theoretical or practically abandoned methods, the manufacture of the negative plates of lead storage batteries is essentially characterized by the fact that the spongy lead, which constitutes the true active material, is produced *in situ*. That is to say, although the initial material from which the spongy lead is ultimately to be made, is applied mechanically to the conducting support, the actual conversion or, as it is technically termed the "forming" of said material into sponge is effected after the application.

The object of the present invention is to permit the production of the ultimate active material in bulk, and its application to the support in what may be properly termed its final condition. Such application is effected wholly mechanically, and without any intervention of electrolytic action at that stage of the process.

Referring to the drawings, I will now describe the conducting support, or grid which I find peculiarly well adapted to use in connection with my improved process.

In said drawings, Figure I, represents a side elevation of the grid; Fig. II, is a broken vertical section thereof on an enlarged scale, taken on the line II, II, in Fig. I. Fig. III, is a broken horizontal section also on an enlarged scale, on the line III, III, in Fig. I.

Said grid consists of an open rectangular frame 1, provided with main bars 2, extending at intervals from top to bottom, and similar main bars 3, extending at intervals horizontally from side to side, with intermediate secondary bars 4, sub-dividing horizontally the rectangular compartments formed by the main bars. The whole structure is preferably cast integrally from antimonial lead. I have found that a grid of this form is peculiarly adapted for the application of the active material by hydraulic pressure, which is effected at one stage of my process.

In the practice of my present invention, I proceed as follows:—

I first obtain a mass of spongy lead, preferably by electrolytic deposition or electrolytic reduction, said mass being sufficient in quantity for the number of plates to be made. After removal from the electrolyte, the spongy lead is thoroughly washed with cold water, and as a result of this treatment, holds a substantial quantity of water. When the spongy lead has been obtained by electrolytic deposition, the particles are usually too large to lend themselves with advantage to the further steps of the process, and I therefore, prefer to pass them through a sieve of about forty mesh, stirring or rubbing it in the course of this treatment so as to properly comminute the crystals. It is then exposed to the atmosphere, so as to permit evaporation of the water, and, if the mass is large, it may be stirred with advantage to increase the uniformity of this action. As the evaporation proceeds, the temperature of the mass rises somewhat, owing to the fact that low oxidation commences, and the primary result is that a thin superficial coating of sub-oxid of lead is formed throughout the interstices of the spongy mass. If this action were allowed to proceed indefinitely, as for instance until the mass became entirely dry through slow evaporation, the conversion into sub-oxid might become so extensive as to substantially change the character of the mass as a whole. Hence the evaporation, by means of which I prefer to effect the limited superficial oxidation, must be arrested at the proper stage. As a practical working rule, the attaining of this stage may be noted by the feel of the damp mass, when squeezed between the fingers. I have found that a condition which corresponds substantially with the "temper" of molding sand, is the proper one for arresting the oxidation, and for applying the subsequent process, and this condition I believe to correspond with the retention of an amount of moisture corresponding to about five per cent. in bulk of the total mass. In this state, the superficially sub-oxidized spongy lead is applied to the grid and compressed within the compartments by the application of heavy pressure.

With a grid whose actual dimensions were those shown in Fig. I, of the drawings, I have employed with advantage, a pressure of fifteen hundred pounds to the square inch. The quantity of active material applied, and the amount of the pressure should be properly coördinated, so that the finished plate shall present smooth faces; flush with the thickness of the frame and main bars, care being taken that none of the structural elements shall be deformed by the pressure.

In this connection it is proper to point out the peculiar and critical conditions upon which the success of the process depends, both from a mechanical standpoint and with relation to the electrical desiderata.

If the spongy lead be taken in a thoroughly wet condition, and the superficial low oxidation above described has not occurred, the attempt to form it into a battery plate by heavy pressure is liable to rupture or distort the grid, since the mass, with its contained water, lacks proper compressibility. Even if the mass be actually compressed, the result will be a coalescence of the lead sponge, so that it will assume a practically solid form, either throughout the whole mass, or in localized portions. To the extent that this condition exists, the plate is impaired for storage battery purposes, since the coalescence of the lead destroys the sponginess, which is of the essence of utility. On the other hand, if the oxidation be permitted to proceed too far, so as to form a relatively large percentage of lead sub-oxid, the mass will not properly cohere under pressure, and moreover will not be in the desired metallic condition for electrical efficiency. It will therefore be seen that the critical point of the process is the controlled oxidation of the spongy lead to substantially the right point for lending itself to heavy compression, while still substantially preserving the integrity of the spongy lead, as such, throughout the great body of the mass.

I have described the above as employed with a lead sponge produced by electrolysis, since I consider this a very desirable adjunct in the preparation of the material. It is to be understood however, that I do not limit my claims to this or any other mode of forming the sponge. Furthermore, while I have described the controlled oxidation as being preferably accomplished by moistening the mass with water and permitting partial evaporation thereof, I do not limit my broad process claim to that specific method, the essential feature being that the oxidation shall be arrested when the mass has, as a whole, the proper consistency for cohesion without substantial coalescence under heavy pressure, and yet substantially maintains the integrity of its metallic condition.

I have found that not only are the plates embodying my invention, remarkably homogeneous in physical condition and with relation to efficiency for electro-chemical reactions, but that they carry a relatively greater quantity of spongy lead than can be applied to a given support by the processes now in actual use. Thus, comparing my plate with one made by applying a paste and then converting the latter into active material, *in situ*, by the use of an electric current, the relatively greater proportion of lead characteristic of my plate is due to the fact that when spongy lead is "formed", from litharge, or other compound of lead, previously applied to the grid, there is driven off in the act of conversion, a relatively large percentage of oxygen and moisture, amounting in some cases to as much as thirty-three per cent. of the total paste or cement initially applied to the plate. If, therefore, the maximum quantity of paste and cement which can be properly held upon the grid, be applied in the first instance, the resultant finished plate will contain less than the total amount of spongy lead which the grid is capable of holding. When however, my invention is employed, the maximum amount of spongy lead can be initially applied to and held upon a grid of given dimensions, since the actual quantity of lead sub-oxid is negligible with relation to the content of the mass as a whole. Furthermore, the process which forms part of my invention possesses valuable features of economy as compared with the processes now in use, since the cost of producing the spongy lead electrolytically, in bulk, and applying it to the grid, is less than the cost of an equivalent amount of litharge, which is the material usually employed for the formation of the active material.

Having described my invention, I desire to point out that the plate thus obtained differs from the negative plates heretofore employed in the art in the particular that the active material is initially "formed" externally to the plate itself, as distinguished from being electrolytically "formed", by the oxidation of the support itself, and the subsequent reduction to spongy lead, *in situ*, (as in the original Planté plate), and as distinguished from the method of reducing a compound of lead mechanically applied to the grid, and thus "forming", the spongy lead by electrolytic action, *in situ*, (as in the Brush-Faure types of plates).

I claim:—

1. An initially "formed" negative plate for a storage battery, consisting of a conducting support and spongy lead particles mechanically applied as such thereto, in a co-herent but non-coalescent mass.

2. The hereinbefore described process for the manufacture of negative plates of a storage battery, which consists in subjecting spongy lead particles, initially "formed" externally to the plate, to superficial oxidation; arresting said oxidation when it has progressed sufficiently to prevent substantial coalescence of the lead particles, while still permitting cohesion thereof, under pressure; and compressing the superficially oxidized particles into a coherent but non-coalescent mass upon a conducting support.

3. The hereinbefore described process for the manufacture of negative plates for a storage battery which consists in preparing spongy lead particles in a mass, containing water, said particles being initially "formed" externally to the plate; permitting partial evaporation of the water to occupy by exposure to the air, and thereby producing a superficial low oxidation of the particles; arresting said oxidation when it has progressed sufficiently to prevent substantial coalescence of the particles, while permitting cohesion thereof, under pressure; and compressing the superficially oxidized particles into a coherent but non-coalescent mass upon a conducting support.

In testimony whereof, I have hereunto signed my name, at Philadelphia, Pennsylvania, this twenty-sixth day of July 1909.

PEDRO G. SALOM.

Witnesses:
JAMES H. BELL,
E. L. FULLERTON.

---

Correction in Letters Patent No. 960,115.

It is hereby certified that in Letters Patent No. 960,115, granted May 31, 1910, upon the application of Pedro G. Salom, of Philadelphia, Pennsylvania, for an improvement in "Negative Plates for Storage Batteries and Processes for the Manufacture Thereof," an error appears in the printed specification requiring correction as follows: Page 3, line 23, the word "occupy" should read *occur;* and that the said Letters Patent should be read with this correction therein that the same may conform to the record of the case in the Patent Office.

Signed and sealed this 21st day of June, A. D., 1910.

[SEAL.]

F. A. TENNANT,
*Acting Commissioner of Patents.* for a storage battery, consisting of a conducting support and spongy lead particles mechanically applied as such thereto, in a co-herent but non-coalescent mass.

2. The hereinbefore described process for the manufacture of negative plates of a storage battery, which consists in subjecting spongy lead particles, initially "formed" externally to the plate, to superficial oxidation; arresting said oxidation when it has progressed sufficiently to prevent substantial coalescence of the lead particles, while still permitting cohesion thereof, under pressure; and compressing the superficially oxidized particles into a coherent but non-coalescent mass upon a conducting support.

3. The hereinbefore described process for the manufacture of negative plates for a storage battery which consists in preparing spongy lead particles in a mass, containing water, said particles being initially "formed" externally to the plate; permitting partial evaporation of the water to occupy by exposure to the air, and thereby producing a superficial low oxidation of the particles; arresting said oxidation when it has progressed sufficiently to prevent substantial coalescence of the particles, while permitting cohesion thereof, under pressure; and compressing the superficially oxidized particles into a coherent but non-coalescent mass upon a conducting support.

In testimony whereof, I have hereunto signed my name, at Philadelphia, Pennsylvania, this twenty-sixth day of July 1909.

PEDRO G. SALOM.

Witnesses:
JAMES H. BELL,
E. L. FULLERTON.

---

Correction in Letters Patent No. 960,115.

It is hereby certified that in Letters Patent No. 960,115, granted May 31, 1910, upon the application of Pedro G. Salom, of Philadelphia, Pennsylvania, for an improvement in "Negative Plates for Storage Batteries and Processes for the Manufacture Thereof," an error appears in the printed specification requiring correction as follows: Page 3, line 23, the word "occupy" should read *occur;* and that the said Letters Patent should be read with this correction therein that the same may conform to the record of the case in the Patent Office.

Signed and sealed this 21st day of June, A. D., 1910.

[SEAL.]

F. A. TENNANT,
*Acting Commissioner of Patents.*

It is hereby certified that in Letters Patent No. 960,115, granted May 31, 1910, upon the application of Pedro G. Salom, of Philadelphia, Pennsylvania, for an improvement in "Negative Plates for Storage Batteries and Processes for the Manufacture Thereof," an error appears in the printed specification requiring correction as follows: Page 3, line 23, the word "occupy" should read *occur;* and that the said Letters Patent should be read with this correction therein that the same may conform to the record of the case in the Patent Office.

Signed and sealed this 21st day of June, A. D., 1910.

[SEAL.]

F. A. TENNANT,
*Acting Commissioner of Patents.*